Dec. 8, 1936.    W. M. POST    2,063,336
PROTECTIVE SYSTEM FOR RAILWAYS
Filed May 10, 1935    2 Sheets-Sheet 1
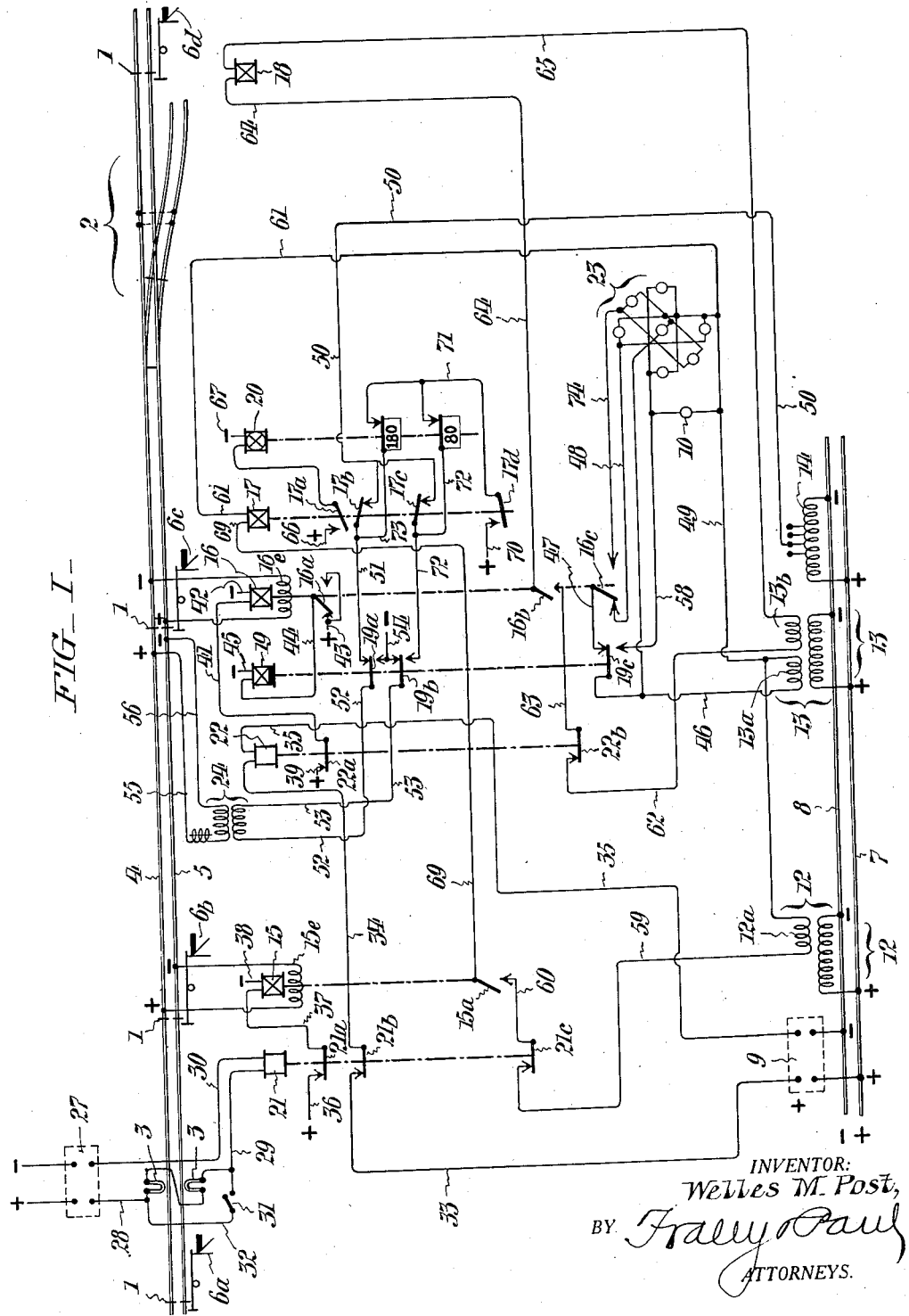

Dec. 8, 1936.  W. M. POST  2,063,336
PROTECTIVE SYSTEM FOR RAILWAYS
Filed May 10, 1935  2 Sheets-Sheet 2
FIG. II
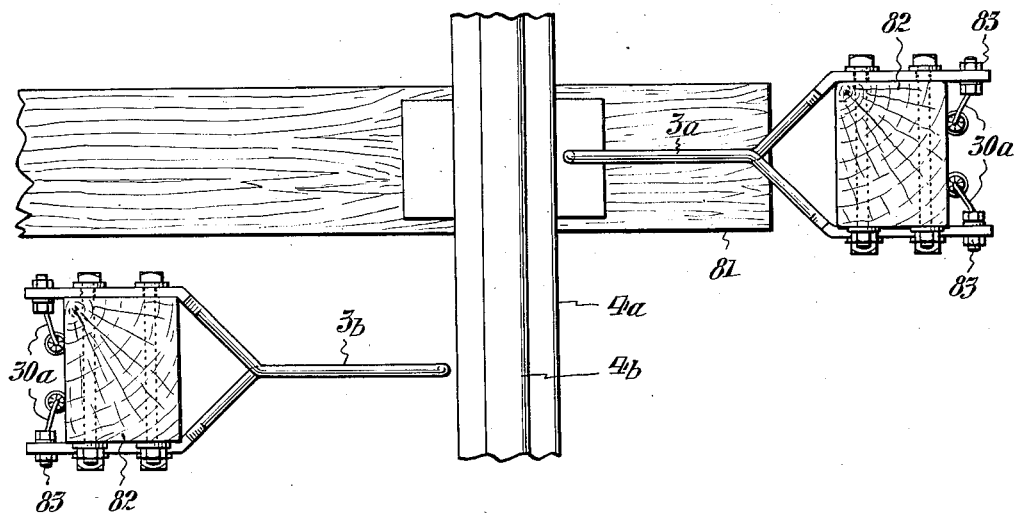
FIG. III
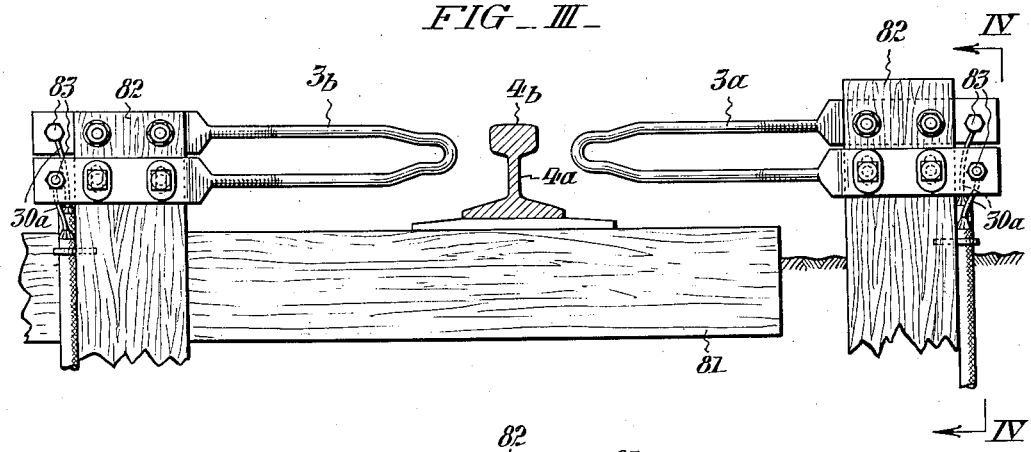
FIG. IV
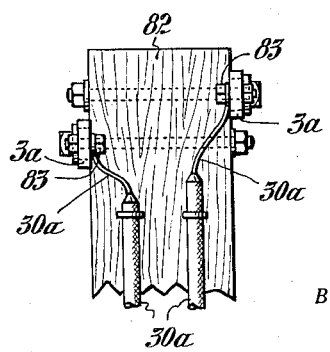
WITNESSES:
Hubert Fuchs
William Bell, Jr.
INVENTOR:
Welles M. Post,
BY Fraley & Paul
ATTORNEYS.

Patented Dec. 8, 1936

2,063,336

UNITED STATES PATENT OFFICE 2,063,336

PROTECTIVE SYSTEM FOR RAILWAYS

Welles M. Post, Wayne, Pa.

Application May 10, 1935, Serial No. 20,776

7 Claims. (Cl. 246—246)

This invention relates to a protective system for railways, and more particularly to signalling apparatus for the detection of broken trucks or parts hanging or dragging from passing vehicles which are likely to cause derailment.

Heretofore many serious accidents have occurred as the result of interference between broken, dragging or hanging equipment on vehicles and parts of switches. For example, broken arch bars on trucks and dragging brake beams have engaged the switch rails in such a manner as to derail a vehicle truck or turn a derailed truck and thus cause wreckage of many vehicles in the train.

The object of the invention is to safeguard against accidents of the nature described, and this end is accomplished by the provision of one or more detector elements positioned alongside the rail and adapted to be engaged by objects suspended from passing vehicles, and signalling means in circuit with the detector elements for warning the operator of the vehicle of the defective condition. Preferably the protective system of this invention is used in conjunction with both an ordinary wayside signalling system and a cab signalling system, but it may be used to advantage with either type of signalling system.

Other objects and advantages characterizing my present invention will become more apparent from the description hereinafter set forth of one example or embodiment of the invention, having reference to the accompanying drawings, whereof:

Fig. I represents a diagrammatic view of a signalling system in which an example of the invention is incorporated.

Fig. II represents a plan view of a rail and detector elements positioned at each side thereof.

Fig. III represents a side elevation of the same, showing the rail in cross section; and Fig. IV represents an end view of one of the detector supports, taken as indicated by the line IV—IV of Fig. III.

With reference to Fig. I of the drawings, there is shown a section of railroad track divided by insulated joints 1 into signalling blocks, and having a turnout, designated comprehensively at 2, and detector elements 3 disposed several blocks in advance of the turnout. The rails are represented at 4, 5. Associated with each signal block there is a wayside signal diagrammatically represented at 6a, 6b, 6c, and 6d.

Current for the operation of the various instrumentalities of the signalling system is supplied from a line illustrated at the bottom of Fig. I, with the positive conductor shown at 7 and the negative conductor shown at 8. A portion of the current passes to a transformer and rectifying unit 9. Current also passes from the line 7, 8 to transformers 12, 13, of which the secondary windings 12a, 13a are cross connected, and to an auto-transformer 14. Other connections to the positive and negative side of the line 7, 8 are indicated by plus and minus signs in order to simplify the illustration of the circuits involved. It will be understood that the various relays and circuits of Fig. I represent only a part of a complete signalling system, though they are sufficient to illustrate a typical example of the function of an interference detector in accordance with the practice of my invention.

The signalling system represented in the drawings includes track relays 15, 16, approach control relays 17, 18, a slow acting relay 19, a code transmitter 20, a detector relay 21 and a detector repeating relay 22. Each of the above named devices operates a series of movable contacts shown in the positions normally occupied with a clear track and designated in the case of the detector relay 21 as contacts 21a, 21b, 21c, and similarly designated by reference number and letter in case of the other relays. In the illustrated example, the system involves at the wayside signal 6c an indicator, such as represented at 23, having three rows of lamps. In accordance with a well-known practice, the vertical row of lamps of the indicator may be considered as the "proceed" signal. The diagonal row of lamps of the indicator 23 may be considered as the "approach" signal; and the horizontal row of lamps, together with a marker 10, may be considered as the most restrictive, or "stop and proceed" signal.

In the illustrated example of the invention, the system also includes a track transformer 24 through which coded current is induced into the rails for operating cab signal equipment, and it may be assumed that indications similar to those displayed at wayside indicators are displayed at the cab indicators. For example, the "proceed" cab signal may be effected by coded current interrupted, say, one hundred and eighty times a minute, the "approach" signal may be effected by coded current interrupted, say, eighty times a minute, and the "caution slow speed" signal, the most restrictive indication, may be effected by uninterrupted current.

Current for the detector circuit is provided by a transformer and rectifying unit 27. When the detector elements 3 are in their normal condition, the current passes from the positive terminal of the transformer and rectifying unit 27 through conductor 28, through the detectors 3 arranged in series, through conductor 29 to the coil of the detector relay 21 and thence through conductor 30 to the negative terminal of the transformer and rectifying unit 27. Thus the detector relay 21 is normally energized, and its movable contacts 21a, 21b, 21c are held in lifted positions. If either of the detector elements 3 is broken by impact with an object suspended from a passing vehicle, the circuit to the detector relay 21 will be opened and that relay de-energized, causing the contacts 21a, 21b, 21c to drop. This circuit may, however, be restored to normal condition by manually closing a switch 31 which shunts the current around the detectors 3 through a conductor 32, and the switch 31 is adapted to be thus closed pending the repair of a broken detector element.

In the normal operation of the system, current flows from the positive terminal of the transformer and rectifying unit 9, through conductor 33, over the movable contact 21b (lifted), through conductor 34 to the detector repeating relay 22, and thence through conductor 35 to the negative terminal of the transformer and rectifying unit 9. The control circuit for the local element of track relay 15 is carried from the positive terminal 36 over the movable contact 21a (lifted), through conductor 37, thence through the local element of the track relay 15 to the negative terminal 38. Likewise the control circuit for the local element of track relay 16 is carried from the positive terminal 39, over the movable contact 22a of the detector repeating relay 22, through conductor 41 to the local element of the track relay 16, and thence to the negative terminal 42.

When the local element of the track relay 15 is energized, and its track element 15e is also energized with current flowing in the same direction, the movable contact 15a is swung to the left, the open position, as represented in Fig. I. Moreover, when the local element of the track relay 16 is energized, and its track element 16e correspondingly energized, its movable contacts 16a, 16b, 16c are swung to the left as indicated in Fig. I. When the track relay 16 is thus energized, current flows from the positive terminal 43, through the movable contact 16a, conductor 44, to the slow acting relay 19, and thence to the negative terminal 45, energizing the slow acting relay 19, holding its contacts 19a, 19b, 19c in raised position. Current from the secondary winding 13a of transformer 13 flows through conductor 46 over movable contact 19c of the slow acting relay 19 to conductor 47, and thence over movable contact 16c and conductor 48 to the vertical row of lamps of the indicator 23, returning over conductor 49 to the negative side of the secondary winding 13a. The "proceed" signal is thus displayed at the indicator 23. Additionally, current flows from the auto-transformer 14, through conductor 50, over movable contact 17b (dropped) of the approach control relay 17, conductor 51, over movable contact 19a (lifted) of slow acting relay 19, to conductor 52, and thence through the primary element of the track transformer 24, conductor 53, movable contact 19b (lifted) to the negative terminal at 54. The secondary element of the track transformer 24 is connected to the rails 4, 5 by conductors 55, 56, respectively, and accordingly a steady current is supplied to the rails, which results in "proceed" wayside signals being displayed at the approaching signal blocks.

In the event that either of the detector elements 3 is broken, the following operations result. The detector relay 21 is de-energized, and its contacts 21a, 21b, 21c are dropped. The circuit to the local element of track relay 15 will then open at contact 21a, causing the track relay 15 to become de-energized, and dropping the movable contact 15a. Simultaneously, the circuit from movable contact 21b to the detector repeating relay 22 is opened, causing movable contacts 22a, 22b to drop. With contact 22a dropped, the circuit is opened from the positive terminal 39 to the local element of track relay 16, and this relay is de-energized, causing its contacts 16a, 16b, 16c to drop to the vertical position. Such movement of contact 16a breaks the circuit to the slow acting relay 19, causing its movable contacts 19a, 19b, 19c, to drop.

Current from the secondary winding 13a of transformer 13 then flows through conductor 46, over contact 19c (dropped), to conductor 58 and through the horizontal row of lamps, as well as through the marker 10, at the indicator 23 to conductor 49 and thence to the negative side of transformer winding 13a, producing the "stop and proceed" indication at signal 6c.

Ordinarily as the engine of a train passes the signal 6b, the track relay 15 is de-energized by the short circuiting of the element 15e, causing the movable contact 15a to close. Current then flows from the secondary winding 12a of the transformer 12, through conductor 59, over contact 21c (lifted) of detector relay 21, conductor 60, contact 15a (closed) of track relay 15, conductor 69, to the approach control relay 17, returning over conductor 61 to the secondary winding 12a. Likewise, under ordinary conditions, when the engine of a train passes the signal 6c, the track element 16e of the track relay 16 is short circuited, causing the movable contact 16b to fall to the vertical position, and current then flows from the secondary winding 13b of the transformer 13, through conductor 62, contact 22b (lifted), conductor 63, contact 16b (closed), conductor 64, to the armature of approach control relay 18, returning over conductor 65 to the secondary winding 13b.

When the approach control relay 17 is energized, its movable contact 17a is lifted, and current flows from the positive terminal 66, over contact 17a to the code transmitter 20, and thence to the negative terminal 67, starting the code transmitter in operation. Additionally, current flows from the positive terminal 70, over movable contact 17d, and conductor 71 through the interrupting contact 80 (causing interruptions at the rate of eighty times per minute), or through interrupting contact 180 (causing interruptions at the rate of one hundred and eighty times per minute), to conductor 72, or 73. Depending upon the condition of the slow acting relay 19, and its contacts 19a, 19b, the current takes either of two courses. If the slow acting relay 19 is energized, the current flows from conductor 73, 51 over movable contact 19a (lifted) to conductor 52, and through the track transformer 24 to conductor 53, returning over contact 19b to the negative terminal 54. Under these conditions, current interrupted at the rate of one hundred and eighty times per minute is induced in the track rails 4, 5. If the slow acting relay 19 is de-energized, current from conductor 72 passes over contact 19b (dropped) to conductor 53 in a reverse direction from that previously described, through the track transformer 24, returning over conductor 52, movable contact 19a (dropped), to the negative terminal 54. In this manner, the cab signals "proceed" or "approach" are induced in the rails.

Moreover, the approach signal at the wayside indicator 23 is displayed under the following conditions. When the slow acting relay 19 is energized, and when the track element 16e of the track relay 16 is energized with current flowing in a direction opposite to the flow of current in the local element of the relay so that its contacts are thrown to the right, current passes from the secondary winding 13a of transformer 13, over conductor 46, movable contact 19c (lifted), conductor 47, movable contact 16c (moved to the right), conductor 74, through the diagonal row of lamps of the indicator 23, returning over conductor 49 to the negative side of the transformer winding 13a.

In the event that either of the detector elements 3 are broken, by the passage of a vehicle thereover, the breaking of the circuit to the detector relay 21 causes contact 21c of that relay to drop, opening the previously described circuit to the approach control relay 17. When the approach control relay 17 is thus de-energized, current flows from the auto-transformer 14 over conductor 50, movable contact 17c (dropped), to conductor 72, and thence over movable contact 19b (dropped), to conductor 53, through the track transformer 24, returning over conductor 52 and contact 19a (dropped), to negative battery at 54. This results in a supply of steady current to the track transformer 24, giving a "caution slow speed" cab signal, the most restrictive indication.

From the above description it will be apparent that upon the breaking of either detecting element 3, the changes are effected in the operation of the regular signalling system, causing restrictive indications to be displayed, both at the wayside and cab indicators, irrespective of the condition of the trackway in advance of the train which has caused the breaking of the detector element.

In Figs. II, III and IV of the drawings, an example is illustrated showing one convenient manner in which detector elements 3a, 3b may be mounted with respect to a rail 4a. Each detector element 3a, 3b comprises a bent strip of fragile conducting material, and is supported in such manner as to project horizontally in the direction of the rail 4a just beneath the level of its tread surface 4b. The detector element 3a is mounted on a vertical post 82 located beyond the end of a tie 81. Conducting wires 30a lead to each end of the detector 3a, the wires being attached thereto by connecting bolts 83. The detector element 3b is disposed at the gage side of the rail 4, and is mounted on a post 82 at one side of the tie 81, with the conducting wires 30a attached to the fixed ends of the bent strip by connecting bolts 83.

Preferably each detector 3a, 3b is so formed as to present a substantially U-shaped free end with the parts thereof lying in a vertical plane and extending transversely of the longitudinal axis of the rail 4a. The detectors 3a, 3b are so arranged that any object hanging from a vehicle within the vicinity of the rail and projecting beneath its tread surface will cause it to break, opening the detector circuit. A sufficient clearance interval is provided between the detector 3b and the rail 4a to allow for the passage of a wheel flange between the rail head and the detector.

While I have described one particular example of a signalling system in which the interference detector of my invention may be incorporated to advantage, it will be observed that the interference detector is adapted for use in many different types of signalling systems, and it will also be apparent that the particular form of the detector and its manner of support may be varied, all without departing from the spirit of the invention as defined in the annexed claims.

Having thus described my invention, I claim:

1. In combination with a railway track, detectors comprising a pair of fragile conducting elements supported one at each side of a rail and projecting towards the rail head, said detectors being electrically connected in series, and signalling means in circuit with said detectors.

2. In combination with a railway track, a detector positioned alongside a rail and adapted to be broken by the passage therealong of a vehicle with an object trailing beneath the wheels thereof, signalling means in circuit with said detector, and a shunt circuit around said detector including a switch.

3. In combination with a railway track, a detector positioned alongside a rail head and spaced therefrom with a clearance interval to allow for the passage of a wheel flange between the rail head and the detector, said detector being operable by striking contact with objects depending from passing vehicles in such manner as to interfere with parts of switches or the like, a wayside signalling system including a signal indicator positioned alongside the track with its indications visible to the operator of the vehicle and normally dependent upon the condition of the track in advance of the vehicle, and means whereby when the detector is struck a restrictive indication is displayed at said indicator.

4. In combination with a railway track, a detector positioned alongside a rail head and spaced therefrom with a clearance interval to allow for the passage of a wheel flange between the rail head and the detector, said detector being operable by striking contact with objects depending from passing vehicles in such manner as to interfere with parts of switches or the like, an inductive signal system whereby coded current is induced in the rails to indicate to the operator of the vehicle the condition of the track in advance of the vehicle, and means whereby when the detector is struck no coded current is induced in the rails.

5. In combination with a railway track, a detector positioned alongside a rail head and spaced therefrom with a clearance interval to allow for the passage of a wheel flange between the rail head and the detector, said detector being operable by striking contact with objects depending from passing vehicles in such manner as to interfere with parts of switches or the like, a signal system including a signal indicator visible to the operator of the vehicle, means whereby the signal displayed at the vehicle is normally dependent upon the condition of the track in advance of the vehicle, and means including a relay in circuit with said detector and a series of movable contacts operated by said relay, whereby when the detector is struck a restrictive signal is displayed at said indicator.

6. In combination with a railway track, a detector comprising a fragile strip of conducting material mounted alongside a rail head and spaced therefrom with a clearance interval to allow for the passage of a wheel flange between the rail head and the detector, said detector having a substantially U-shaped free end projecting from the point of support toward the rail in a vertical plane, and signalling means in circuit with said detector.

7. In combination with a railway track, detectors comprising a pair of fragile strips of conducting material mounted at each side of a rail, each strip having a free end projecting from the point of support toward the rail head transversely of the longitudinal axis thereof, one of said strips being spaced from the rail head to allow for the passage of a wheel flange between it and the rail head, said detectors being electrically connected in series, and signalling means in circuit with said detectors.

WELLES M. POST.